※United States Patent Office 3,393,955
Patented July 23, 1968

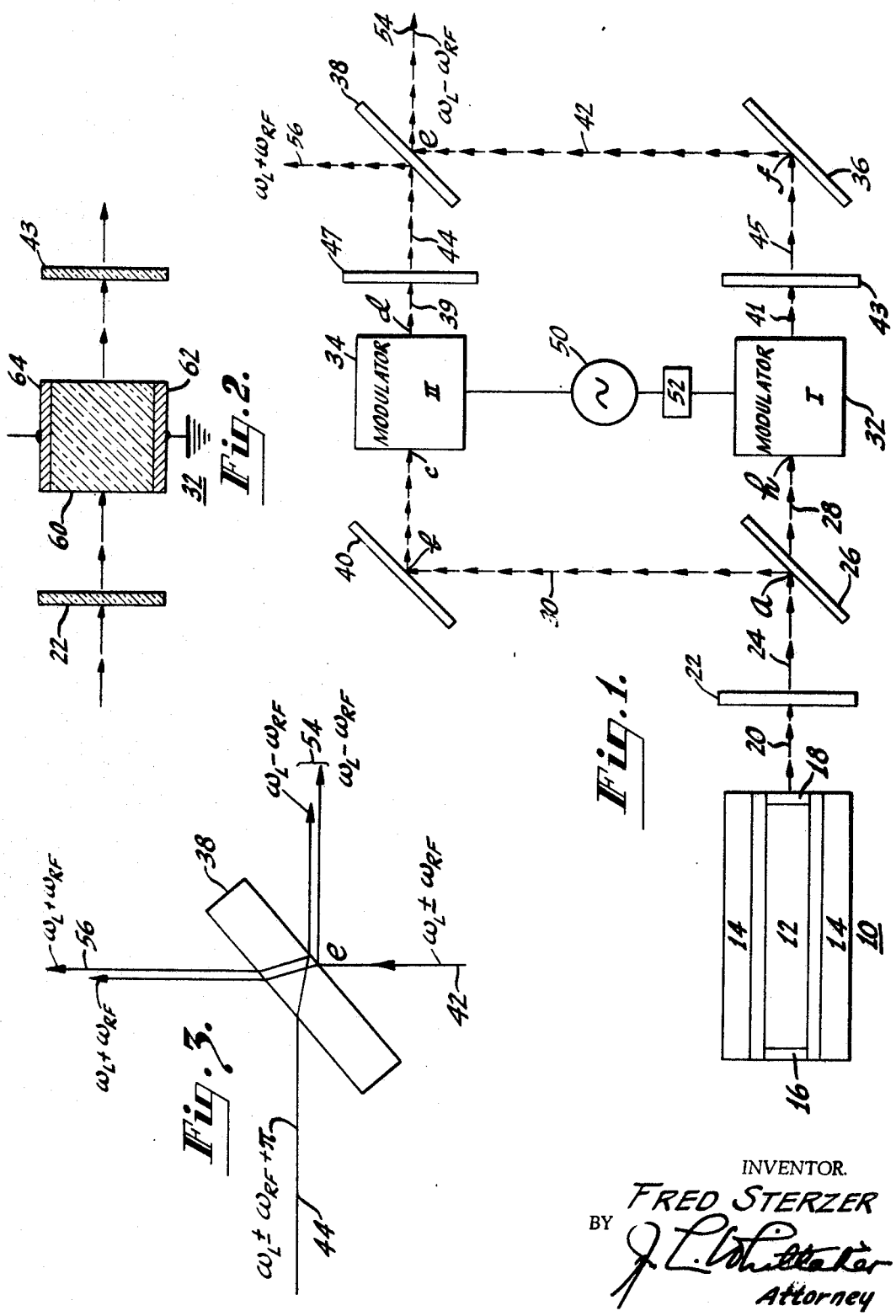

3,393,955
LIGHT FREQUENCY SHIFTER
Fred Sterzer, Princeton, N.J., assignor to Radio Corporation of America, a corporation of Delaware
Continuation of application Ser. No. 271,219, Apr. 8, 1963. This application July 21, 1967, Ser. No. 655,240
2 Claims. (Cl. 350—150)

ABSTRACT OF THE DISCLOSURE

There is disclosed a light frequency shifter in which a monochromatic beam of laser light is split into two beams each of which is applied to a separate electro-optic balanced modulator. The split beams applied to the two separate modulators are 90° degrees out of phase with each other in a given sense. In addition, each modulator has a modulating signal applied thereto which modulating signals are identical in all respects except that they are 90 degrees out of phase with each other in the same given sense. In this manner, upper and lower sideband frequencies are produced from each of the modulators which are identical in all respects except that the sidebands produced by one modulator are 180 degrees out of phase with respect to the corresponding sidebands produced by the other modulator. The outputs of the modulators are applied as inputs to a semi-reflecting mirror in a manner such that the semi-reflecting mirror produces a first output beam which consists solely of the upper sideband and a second output beam which consists solely of the lower sideband.

---

This is a continuation of my copending application, Ser. No. 271,219, filed Apr. 8, 1963, and now abandoned.

The invention described was made in the course of or under a contract or subcontract thereunder with the Department of the Air Force.

This invention relates to an improved laser, or optical maser, system. In particular, this invention relates to a novel method of and means for controlling and shifting the frequency of a coherent light beam.

The term laser is used to refer to a device which provides "light amplification by stimulated emission of radiation." The laser device is, at present, most commonly used as a source of coherent light.

In general, a laser includes one or more active materials, which will produce radiation; a pumping source that excites the active material; and a resonant structure such as a resonant cavity tuned to the radiation frequency.

The active material is a material having two energy levels which are separated by an amount corresponding to a characteristic output frequency. The active material is characterized by the properties that: (1) its atomic particles can be excited into the higher of two energy levels, whereby an inverted population condition can be established, and (2) when the atomic particles return to the lower energy level, the active material emits light. The emitted light is such that, within the active laser material, an incident photon triggers an ion to emit a photon in phase with the incident photon. Thus, substantially all of the emitted light is substantially in phase and is described as coherent light.

The pumping source is a source of energy which is positioned adjacent to the active material and is used to excite the ions of the active material into the higher energy level. The pumping source may comprise an RF field, a light source or, in certain instances, an electrical power supply connected directly to the active material.

The resonant cavity normally includes two light reflecting surfaces, such as mirrors, positioned at the ends of the active material. At least a portion of one of the light reflecting surfaces is partially transparent so that output light may be obtained from the laser through the partially transparent surface. The light reflecting surfaces are precisely oriented so that at least one resonant mode exists between the mirrors at frequencies for which the spacing between mirrors corresponds to a path length of an integral number of half wavelengths.

The laser device, briefly described above, provides a beam of coherent light having a predetermined wavelength. Means to shift the single wavelength, or frequency, of the coherent light beam, by a controlled amount, would enhance the usefulness of a laser device.

For example, a controlled frequency shifter is desirable for a Doppler radar system. A Doppler radar system detects a change in frequency, or change in wavelength, of the signal returning from a moving object under surveillance. Because this returning signal may be any frequency, within an extremely broad band of frequencies, for high accuracy it is necessary, for example, that the detector of the returning signal be capable of handling an extremely broad frequency band, or that some type of accurately controlled frequency null detector be used.

Detectors capable of accurately detecting a frequency change throughout an extremely broad band of frequencies are difficult to construct and are expensive. Therefore, the easiest and least expensive method of detecting a particular frequency, of a returning light signal, is to compare the returning signal with a controllably variable frequency standard, and adjust the frequency of the standard until a null is obtained. When this is done, a reading of the frequency of the standard may be made which is an accurate representation of the speed of the moving object. To produce this result, an accurate light frequency shifter is desirable.

It is therefore an object of this invention to provide an improved light frequency shifter.

It is another object of this invention to provide a novel means for shifting the frequency of a coherent light beam.

It is a further object of this invention to provide an improved optical frequency shifter useful in an optical Doppler radar system.

It is a still further object of this invention to provide a novel means for spatially separating side bands of a light beam.

These and other objects of this invention are accomplished by directing each of two coherent light beams of the same frequency, or each of two components separated from one coherent light beam, through a different one of two light modulators. The two light beams are of the same polarization and are applied to the modulators in phase quadrature. The two modulators suppress the carriers and vary the polarization of the two beams. In an embodiment, the modulators are driven by an RF source with the phase of the RF driving the first modulator being 90° behind the phase of the RF driving the second modulator. After the light beams are passed through the two modulators, they are passed respectively through analyzers and combined at a semitransparent output mirror. The path length of the two beams is adjusted so that the two lower side bands, or components, of both beams arrive in phase to interfere constructively in one direction, and the two upper side bands of both beams arrive to interfere constructively in an orthogonal direction. Thus, the upper and lower side bands are separated spatially at the semitransparent output mirror. By simultaneously varying the frequency of the RF potential applied to the modulators, the wavelength, or frequency, of the light output is shifted by an amount depending upon the frequency of the RF potential applied to the modulators.

The invention will be described in greater detail by reference to the accompanying drawings wherein:

FIG. 1 is a partially schematic view of an embodiment of a laser and a frequency shifter system in accordance with this invention;

FIG. 2 is a partially schematic view of an electro-optic light modulator which may be used in the system of FIG. 1; and FIG. 3 is a greatly enlarged partially schematic view of the semitransparent output mirror of FIG. 1.

Similar reference characters refer to similar elements throughout the drawings.

FIG. 1 shows an apparatus 10 for producing coherent radiation. When the coherent radiation is in the light spectral range, the device 10 is known as a laser. The laser 10 comprises an active material 12, a pumping source 14 and a pair of optical reflecting surfaces 16 and 18 which define the opposite ends of an optical resonant cavity.

The active material 12 may comprise a substance which has two atomic states, or energy levels, separated by an amount corresponding to a characteristic frequency of the active material 12. The active laser material 12 has the property of being excitable into an inverted population density condition, i.e., the property that an excess population of ions can be established in the upper energy state. The active material 12 emits substantially coherent radiation as the atomic particles return from the higher energy level to a lower energy level. A specific example of an active material 12 which exhibits laser action is calcium fluoride doped with divalent dysprosium. Another example of an active material 12, which is known to exhibit laser action, is a gallium arsenide P-N junction.

The pumping source 14 may comprise any source of energy which is capable of exciting the atomic particles in the active material 12 from a lower energy level into the desired higher energy level. Thus, the pumping source 14 is a source of radiation which is capable of establishing the inverted population density condition in the active material 12. Examples of such pumping sources are a means for providing an RF field, a xenon flash tube, or other suitable known types of energy sources. When the P-N junction type of active material 12 is used, the active material may be electrically pumped by a power source connected to the electrodes of the junction.

The active material 12 is positioned in an optical resonant cavity. Thus, adjacent to the ends of the active material 12 are light reflecting mirrors 16 and 18. One of the mirrors, e.g., light reflecting device 18, is made so that at least a portion thereof is partially transparent so that an output coherent light beam 20 may be obtained from the device 10. When the active material 12 is made of certain materials, e.g., gallium arsenide, the ends of the P-N junction may be optically flat and/or polished, and the air interface will function as a light reflecting surface.

The light beam 20 from the laser 10 is then passed through a light polarizer 22. When the light beam 20 is linearly polarized, the polarizer 22 may be omitted. Assuming that a polarizer is needed, then polarizer 22 may be any conventional linear light polarizer such as a conventional Nicol prism. The balance of the description will assume that a linear polarizer is used as the polarizer 22, or that the laser light 22 is linearly polarized.

After passing through the polarizer 22, the coherent light beam 24 is linearly polarized and is directed through a partially reflecting, e.g., a partially silvered, mirror 26. Partially silvered mirrors are conventional and the mirror 26 may be of any conventional type and is preferably designed so that approximately half of the light beam 24 is passed directly through as a light beam 28 and half of the light beam 24 is reflected as a light beam 30. Both of the coherent light beams 28 and 30 are linearly polarized.

The coherent light beam 28 is then passed through a first light modulator 32 while the beam 30 is passed through a second light modulator 34. The light modulators 32 and 34 may be of any type, such as an electro-optic cell, and an example will be described in detail in connection with FIG. 2. In brief, the modulators 32 and 34 change the polarization of the light beams passing therethrough in response to an electric signal.

The phase of the light beam 30 is adjusted by any known means, so that the phase of the light entering modulator 34 is 90° ahead of the phase of the light beam 28 entering modulator 32. This can be done by any conventional means such as by adjusting the relative path lengths of $a-b-c$ and $a-h$. The path lengths of the light beams shown in FIG. 1 are representative of many complete light cycles, and only the relative phases of the beams 28 and 30, as they enter the modulators, are adjusted for 90° phase shift.

The modulated light beam 41 is then directed through an analyzer 43, which may be a plate which passes only light polarized at right angles to the direction of polarization of the light incident on the modulator. The light 45 emerging from the analyzer 43 will be only the light which has had its polarization rotated by the modulator 32. The modulation signal produces a suppressed carrier double side band modulation. Light which has not had its polarization rotated will be absorbed by the analyzer 43 since this component of light 28 is polarized at right angles to the direction of polarization which the analyzer can pass, as was previously explained. Thus, the light beam 45 will be a suppressed carrier, amplitude modulated light beam. The amplitude modulated light beam 45 is directed onto a completely reflecting mirror 36 where it is reflected as a light beam 42 to land on a partially reflecting mirror 38.

The relative directions and the plane of incidence defined by the light beam 45 and the mirror 36, and the direction of polarization of the light beam 30 are adjusted so that the light reflected from the mirror 36 is linearly polarized in the same direction as the light incident on the mirror 36.

The light beam 30, which is also linearly polarized by the polarizer 22, is directed onto a completely reflecting mirror 40. The relative directions of the plane of incidence defined by light beam 30 and the mirror 40, and the direction of polarization of light beam 30 are adjusted so that the light reflected from the mirror is linearly polarized in the same direction as the light incident on the mirror. After being reflected from mirror 40, the light beam passes through the second modular 34 and through an analyzer 47. The modulator 34 rotates the polarization of the light beam 30 and this light is passed through the analyzer 47 only if the polarization of the light has been rotated by the second modulator 34. Thus, the light beam 44 is a suppressed carrier, double side band, coherent light beam that is effectively amplitude modulated by signals applied to the second modulator 34. The suppressed carrier amplitude modulated light beam 44 is directed onto the partially reflecting mirror 38. Both of the coherent light beams 42 and 44 arrive in register on the partially silvered mirror 38.

In the embodiment of FIG. 1, both of the light modulators 32 and 34 are driven from a common RF source 50 having a frequency of $\omega_{rf}$. An example of a suitable RF source is a klystron oscillator. The phase of the RF drive at modulator 32 is made to be 90° behind (lagging) the phase of the RF drive at modulator 34. This is accomplished by means of a phase shifter or phase delay device 52. An example of a phase shifter is a transmission line. It should be understood that two RF sources may be used as long as they are the same frequence, and the phase of the RF modulation at the driving modulator 32 is 90° behind the phase of the RF modulation at the driving modulator 34.

The frequency shifter system shown in FIG. 1 is arranged so that the total phase shift of the portion 28 of the light beam, i.e., the phase shift from point "a" to the first modulator 32, exceeds the phase shift of the portion 30, i.e., the phase shift from point "a" to the second modulator 34, by 90°. The relative phase shift may also be obtained by using two laser beams, operating at the same frequency, rather than splitting one laser beam into two portions, and adjusting the relative phases of the beams by spacing or optical means.

The polarization modulators 32 and 34 produce two side bands on their respective laser beams 39 and 41, i.e., $\omega_L \pm \omega_{rf}$. The relative phases of the inputs and outputs of both of the modulators may be tabulated as follows:

|  | Modulator 32 | Modulator 34 |
| --- | --- | --- |
| Incident light | $\cos \omega_L t$ | $\cos (\omega_L t + \pi/2)$ |
| Input RF drive | $\cos \omega_{rf} t$ | $\cos (\omega_{rf} t + \pi/2)$ |
| Output Light | $\cos (\omega_L - \omega_{rf})t$ | $\cos (\omega_L - \omega_{rf})t$ |
|  | $\cos (\omega_L + \omega_{rf})t$ | $\cos [(\omega_L + \omega_{rf})t + \pi]$ |

The path lengths of the two light beams 42 and 44 are adjusted so that the two beams arrive in phase at point "e" of the partially reflecting mirror 38. The plane of incidence of this mirror 38 is adjusted so that the plane of polarization of light beams 42 and 44 is perpendicular to this plane of incidence. Under these conditions, a 180° phase shift occurs for the part of the beam 42 which is reflected back into the rare medium, air, from the interface with the more dense medium, the partially reflecting dielectric 38. There is no relative change in the phase of the balance of the light beams caused by the partially reflecting mirror 38. The phenomena of 180° phase shift under these conditions is explained in detail in Born and Wolf, Principles of Optics, Chapter I, Pergamon Press, 1959.

As a result of this arrangement, the two lower side bands $(\omega_L - \omega_{rf})$ of beams 42 and 44 are in phase to constructively interfere with each other in one direction and will be transmitted as a light beam 54. The two upper side bands $(\omega_L + \omega_{rf})$ of beams 42 and 44 are in phase in an orthogonal direction and are transmitted as light beam 56. Thus, the two side band frequencies $(\omega_L + \omega_{rf})$ and $(\omega_L - \omega_{rf})$ are spatially separated by means of the half-reflecting mirror 38.

The output light beams 54 and 56 will be amplitude modulated by the RF source 50, and the carrier will be suppressed. Thus, the system illustrated in FIG. 1 can be used as an amplitude modulator as well as a light frequency shifter.

FIG. 2 shows an example of a light modulator in detail which may be used as either the first modulator 32 or the second modulator 34 of FIG. 1. The modulator 32 is an electrically controlled modulator comprising a crystal 60 of a cubic material exhibiting the linear electro-optic effect. One example of a suitable cubic material is cuprous chloride. On the crystal 60 there are positioned two electrodes 62 and 64 for applying a potential thereto. This type of light modulator is described in an article by F. Sterzer, D. J. Blattner, H. K. Johnson, S. F. Miniter; "Cuprous Chloride Light Modulators," Digest of Technical Papers, February 1963, International Solid States Circuits Conference, Philadelphia, Pa.

In general, electro-optic modulators modulate the polarization of the light beam passing therethrough in response to an electric field applied to the electrodes. Thus, the light passing through the adjacent analyzer is a carrier suppressed amplitude modulated light beam. It should be understood that other types of known modulators, such as magneto-optic modulators, may be used with this invention.

FIG. 3 shows a greatly enlarged view of the partially reflecting dielectric member 38 to illustrate the paths of the various light beams. The light paths of the beams 42 and 44 are actually superimposed but are shown as striking slightly different areas of the partially reflecting dielectric 38 for simplicity of illustration. The dielectric 38 may be a material such as glass. As was previously stated, the portion of the light beam 42 which is reflected from the dielectric 38 has its phase shifted 180° by the reflection. The balance of the light beams, i.e., the transmitted portion of beam 42 and the transmitted and reflected portions of beam 44 do not have their relative phases changed by the mirror 38.

As an alternative method of operation of the embodiment described in FIG. 1, the phase of the light beam 30 may be adjusted to be 90° ahead of that of the light beam 28. Then, in this operation, the modulating RF fed to both modulators 32 and 34 may have the same phase. Then, by means such as adjusting the spacing, an additional 90° phase advance may be applied to the light beam 41 after the beam 41 has been modulated. Or, if desired, a 90° phase delay may be applied to light beam 42. After either the phase advance or phase delay, the two beams are combined at the partially reflecting dielectric 38 as has been desired.

The mathematical expressions for the operation of the light frequency shifter of FIG. 1 are set forth in the following appendix.

(1) $\qquad E_L = E_{Lo} \sin (\omega_L t + \theta_L)$ where:
$E_L$ = electric field of light transmitted by analyzers 43 or 47
$E_{Lo}$ = amplitude of the electric field of the light passed by the analyzers 43 or 47
$\omega_L$ = angular frequency of the light
$\theta_L$ = phase angle of the light transmitted by an analyzer 43 or 47

(2) $\qquad E_{Lo} = E \sin \left(\dfrac{\pi V}{2V_{\lambda/2}}\right)$ where:
$V$ = voltage applied to the modulator 32 or 34
$V_{\lambda/2}$ = voltage required to rotate the direction of polarization by 90°
$E$ = amplitude of light incident on modulator 32 or 34

(3) $\qquad V = V_o \sin (\omega_{rf} t + \theta_{rf})$ where:
$V_o$ = amplitude of RF drive voltage
$\omega_{rf}$ = angular frequency of the RF
$\theta_{rf}$ = phase of the RF Substituting 3 into 2

$$E_{Lo} = E \sin \left(\dfrac{\pi V_o}{2V_{\lambda/2}} \sin [\omega_{rf} t + \theta_{rf}]\right)$$

$$= 2EJ_1 \left(\dfrac{\pi V_o}{2V_{\lambda/2}}\right) \sin (\omega_{rf} t + \theta_{rf}) + 2E$$

$$= J_3 \left(\dfrac{\pi V_o}{2V_{\lambda/2}}\right) \sin (3\omega_{rf} t + \theta_{rf})t$$

where:
$J_1$ = first-order Bessel function
$J_3$ = third order Bessel function

Under the conditions that:

|  | Modulator 34 | Modulator 32 |
| --- | --- | --- |
| Input | $\theta_{rf} = 0$ | $\theta_{rf} = \pi/2$ |
| Input | $\theta_L = 0$ | $\theta_L = \pi/2$ |

Then, at modulator 34, neglecting higher order forms.

$$E_L = 2EJ_1 \left(\dfrac{\pi V_o}{2V_{\lambda/2}}\right) \sin (\omega_{rf} t) \sin (\omega_L t)$$

$$= EJ_1 \left(\dfrac{\pi V_o}{2V_{\lambda/2}}\right) \cos (\omega_L - \omega_{rf})t -$$

$$EJ_1 \left(\dfrac{\pi V_o}{2V_{\lambda/2}}\right) \cos (\omega_L + \omega_{rf})t$$

At modulator 32

$$E_L = 2EJ_1\left(\frac{\pi V_o}{2V_{\lambda/2}}\right) \cos(\omega_{rf}t) \cos(\omega_L t)$$

$$= EJ_1\left(\frac{\pi V_o}{2V_{\lambda/2}}\right) \cos(\omega_L - \omega_{rf})t +$$

$$EJ_1\left(\frac{\pi V_o}{2V_{\lambda/2}}\right) \cos(\omega_L + \omega_{rf})t$$

$$E_A = 2EJ_1\left(\frac{\pi V_o}{2V_{\lambda/2}}\right) [\cos(\omega_L + \omega_{rf})t]$$

$$E_B = 2EJ_1\left(\frac{\pi V_o}{2V_{\lambda/2}}\right) [\cos(\omega_L - \omega_{rf})t]$$

$E_A$ = Electric field of light beam 56
$E_B$ = Electric field of light beam 54

What is claimed is:

1. Optical apparatus comprising light translating means having a substantially semi-reflecting surface forming the boundary between a first medium having a relatively low index of refraction and a second medium having a relatively high index of refraction, said surface being responsive to a first input light beam arriving at a given point thereof from a first predetermined direction for reflecting substantially one half of said first input light beam and transmitting substantially the other half of said first input light beam and being responsive to a second input light beam arriving at said given point thereof from a second predetermined direction for reflecting substantially one half of said second input light beam and transmitting substantially the other half of said second input light beam, said first and second predetermined directions being such that the reflected half of one of said first and second input light beams coincides with the transmitted half of the other of said first and second input light beams to thereby form a resultant output light beam, first means for applying to said given point as said first input light beam a first light signal incident on said semi-reflecting surface from said first medium, said first light signal comprising a first component having a first certain frequency, amplitude and phase at said given point and a second frequency component having a second certain frequency, amplitude and phase at said given point, both said first and second components of said first light signal being polarized in a direction substantially normal to the plane of incidence thereof with said semireflecting surface, and second means for applying to said given point as said second input light beam a second light signal incident on said semi-reflecting surface from said second medium, said second light signal comprising a first component having substantially said first certain frequency, amplitude and phase at said given point and a second component having substantially said second given frequency and amplitude and a phase which is substantially opposite to said second certain phase at said given point, both said first and second components of said second light signal being polarized in a direction substantially normal to the plane of incidence thereof with said semireflecting surface, whereby one of said first and second frequency components is substantially cancelled in said output light beam.

2. The optical apparatus defined in claim 1, wherein said first and second predetermined directions are such that the reflected half of said other of said first and second input light beams coincides with the transmitted half of said one of said first and second input light beams to thereby form a second resultant output light beam in a different direction from said first-mentioned resultant output beam, whereby the other of said first and second frequency components is substantially cancelled in said second output light beam.

References Cited
UNITED STATES PATENTS

| | | | |
|---|---|---|---|
| 2,385,085 | 9/1945 | Labin | 250—199 X |
| 3,175,088 | 3/1965 | Herriott | 88—61 X |

JEWELL H. PEDERSEN, *Primary Examiner.*

E. S. BAUER, *Assistant Examiner.*